US007950459B2

(12) United States Patent
Sullivan et al.

(10) Patent No.: US 7,950,459 B2
(45) Date of Patent: *May 31, 2011

(54) USING A BIPHASIC SOLUTION AS A RECYCLABLE COILED TUBING CLEANOUT FLUID

(75) Inventors: Philip F. Sullivan, Bellaire, TX (US); Gary John Tustin, Sawston (GB); Yiyan Chen, Sugar Land, TX (US); Lijun Lin, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/354,500

(22) Filed: Jan. 15, 2009

(65) Prior Publication Data
US 2010/0175881 A1 Jul. 15, 2010

(51) Int. Cl.
*E21B 36/00* (2006.01)
*E21B 37/00* (2006.01)
(52) U.S. Cl. .................. 166/302; 166/312; 507/904
(58) Field of Classification Search .................. None
See application file for complete search history.

(56) References Cited

U.S. PATENT DOCUMENTS

| | | | |
|---|---|---|---|
| 3,629,101 A * | 12/1971 | Hille et al. | 507/122 |
| 3,937,283 A | 2/1976 | Blauer et al. | |
| 4,425,241 A | 1/1984 | Swanson | |
| 4,795,772 A | 1/1989 | Hsieh | |
| 5,110,486 A | 5/1992 | Manalastas et al. | |
| 5,190,374 A | 3/1993 | Harms et al. | |
| 5,382,411 A | 1/1995 | Allen | |
| 5,426,137 A | 6/1995 | Allen | |
| 5,892,147 A | 4/1999 | Garnes et al. | |
| 6,011,075 A | 1/2000 | Parris et al. | |
| 6,017,855 A | 1/2000 | Dawson et al. | |
| 6,169,058 B1 | 1/2001 | Le et al. | |
| 6,180,587 B1 | 1/2001 | Fuller et al. | |
| 6,383,990 B1 | 5/2002 | Dawson et al. | |
| 6,450,260 B1 | 9/2002 | James et al. | |
| 6,489,270 B1 | 12/2002 | Vollmer et al. | |

(Continued)

FOREIGN PATENT DOCUMENTS

EP  0 358 385 A2  3/1990

(Continued)

OTHER PUBLICATIONS

Closs, C.B. et al. Phase Separation and Rheology of Aqueous Starch/Galactomannan Systems. Carbohydrate Polymers, vol. 39, pp. 67-77. 1999.

(Continued)

*Primary Examiner* — George Suchfield
(74) *Attorney, Agent, or Firm* — Rachel Greene; David Cate; Jeff Griffin

(57) ABSTRACT

Methods and apparatus for forming a fluid for use within in a subterranean formation including combining a partitioning agent and viscosifying polymer into a fluid, introducing the fluid into the subterranean formation, and recovering at least a portion of the fluid at a uppermost surface of the subterranean formation. Methods and apparatus of forming a fluid for use within in a subterranean formation including combining a partitioning agent and viscosifying polymer into a fluid, introducing the fluid into the subterranean formation at a temperature of about 45° C. or higher, and recovering at least a portion of the fluid at a uppermost surface of the subterranean formation at a temperature of about 45° C. or lower.

17 Claims, 7 Drawing Sheets

U.S. PATENT DOCUMENTS

| | | |
|---|---|---|
| 6,645,769 B2 | 11/2003 | Tayebi et al. |
| 6,727,209 B2 | 4/2004 | Pereira et al. |
| 6,733,769 B1 | 5/2004 | Ryan et al. |
| 6,805,879 B2 | 10/2004 | Jin et al. |
| 6,810,959 B1 | 11/2004 | Qu et al. |
| 6,818,594 B1 | 11/2004 | Freeman et al. |
| 6,838,418 B2 | 1/2005 | Allan et al. |
| 6,843,841 B2 | 1/2005 | Reddy et al. |
| 6,987,083 B2 | 1/2006 | Phillippi et al. |
| 6,998,393 B2 | 2/2006 | Jin et al. |
| 7,004,254 B1 | 2/2006 | Chatterji et al. |
| 7,032,662 B2 | 4/2006 | Malone et al. |
| 7,090,015 B2 | 8/2006 | Todd et al. |
| 7,117,942 B2 | 10/2006 | Dalrymple et al. |
| 7,151,078 B2 | 12/2006 | Zaroslov et al. |
| 7,195,065 B2 | 3/2007 | Kelly et al. |
| 7,207,387 B2 | 4/2007 | Eoff et al. |
| 7,220,713 B2 | 5/2007 | Patel et al. |
| 7,270,184 B2 | 9/2007 | Kotlar et al. |
| 7,287,587 B2 | 10/2007 | Reddy et al. |
| 7,287,588 B2 | 10/2007 | Zaroslov et al. |
| 7,290,615 B2 | 11/2007 | Christanti et al. |
| 7,311,146 B1 | 12/2007 | Hanes, Jr. et al. |
| 7,316,275 B2 | 1/2008 | Wang et al. |
| 7,322,414 B2 | 1/2008 | Reddy et al. |
| 7,347,260 B2 | 3/2008 | Ferguson et al. |
| 7,351,681 B2 | 4/2008 | Reddy et al. |
| 2001/0018972 A1* | 9/2001 | Bayliss et al. ............... 166/292 |
| 2002/0055461 A1 | 5/2002 | Jin et al. |
| 2004/0209780 A1 | 10/2004 | Harris et al. |
| 2004/0256106 A1 | 12/2004 | Phillippi et al. |
| 2005/0155796 A1 | 7/2005 | Eoff et al. |
| 2005/0199396 A1 | 9/2005 | Sierra et al. |
| 2005/0272612 A1 | 12/2005 | Dawson et al. |
| 2006/0054324 A1 | 3/2006 | Sullivan et al. |
| 2006/0166837 A1 | 7/2006 | Lin et al. |
| 2006/0234874 A1 | 10/2006 | Eoff et al. |
| 2006/0258542 A1 | 11/2006 | Segura |
| 2007/0114035 A1 | 5/2007 | Parris et al. |
| 2008/0081771 A1 | 4/2008 | Lin et al. |
| 2008/0096774 A1 | 4/2008 | Tabary et al. |
| 2008/0121395 A1 | 5/2008 | Reddy et al. |
| 2009/0023614 A1 | 1/2009 | Sullivan et al. |
| 2009/0023615 A1 | 1/2009 | Chen et al. |
| 2009/0163387 A1 | 6/2009 | Sullivan et al. |
| 2009/0205824 A1 | 8/2009 | Sullivan et al. |
| 2010/0184630 A1* | 7/2010 | Sullivan et al. ............... 507/216 |

FOREIGN PATENT DOCUMENTS

| | | |
|---|---|---|
| EP | 0 846 747 A1 | 6/1998 |
| EP | 0 583 814 B1 | 10/1998 |
| GB | 2 172 008 A | 9/1986 |
| JP | 61225275 A | 10/1986 |
| WO | 03106809 A1 | 12/2003 |
| WO | 2006024795 A1 | 8/2007 |
| WO | 2007085983 | 8/2007 |
| WO | 2009010932 | 1/2009 |
| WO | 2009070656 | 6/2009 |
| WO | 2009104108 | 8/2009 |

OTHER PUBLICATIONS

Tolstoguzov, V. Phase Behavior in Mixed Polysaccharide Systems. Chapter 17 in Food Polysaccharides and Their Applications, edited by A.M. Stephen, G.O. Phillips and P.A. Williams. 2006.

* cited by examiner

US 7,950,459 B2

USING A BIPHASIC SOLUTION AS A RECYCLABLE COILED TUBING CLEANOUT FLUID

FIELD OF THE INVENTION

This invention relates to fluids having recyclable viscosity and their use in oilfield treatments. More particularly, it relates to compositions and methods for cleaning debris from wellbores and wellbore tubing. Even more particularly it relates to removal of drill cuttings and other contaminants from a wellbore before or after cementing or completion and to removal of particulates after stimulation and/or during production. Most particularly, it relates to methods and compositions for recycling a fluid used in such cleanout operations.

BACKGROUND OF THE INVENTION

Material that has accumulated in a wellbore before or during completion is often called wellbore fill; it may be sand, proppant, cement chunks, or other materials. Such materials hinder or prevent operations. Sand accumulated in production tubing in a wellbore at the start of or during production can greatly hinder production. Coiled tubing has been widely used as a means to clean out the wellbore or production tubing in these situations. Coil tubing cleanouts of wellbores are commonly performed to remove "wellbore fill." Such fill may comprise sand, proppants, cement chunks and debris from previous wellbore operations. Coiled tubing equipment is commonly used as the cleanout equipment. Such cleanout operations utilize fluids pumped down the wellbore through coiled tubing to pick up solid particles and then transport the particles back to the surface. To be effective at entraining and carrying solid particles, fluids used in cleanout operations are often viscosified. Most typically, however, these viscosified fluids are discarded after a single trip through the well because removal of the entrained solids from the fluid either requires a long "settling time" or the addition of a chemical "breaker" to reduce the fluid viscosity.

Requirements for fluids used for wellbore fill removal, more particularly "coiled tubing cleanout", include low friction pressure and good particle carrying capability. Some crosslinked polymer gels are not preferred viscosifiers for cleanout fluids because they do not have preferred viscoelastic properties for fluidizing the particles so that they can be transported. Cleanout systems that can be recycled have not been reported, and would be highly desirable for logistical and operational reasons, especially in offshore locations. Such recyclable cleanout systems also give cost benefits and are environmentally friendly.

SUMMARY OF THE INVENTION

Embodiments of the invention provide methods and apparatus for forming a fluid for use within a subterranean formation comprising combining a partitioning agent, a viscosifying polymer, and introducing the fluid into the subterranean formation, and recovering at least a portion of the fluid at a uppermost surface of the subterranean formation. Embodiments of the invention provide methods and apparatus for forming a fluid for use within a subterranean formation comprising combining a partitioning agent, a viscosifying polymer, and introducing the fluid into the subterranean formation at a temperature of about 120 F or higher, and recovering at least a portion of the fluid at a uppermost surface of the subterranean formation at a temperature of about 120 F or lower.

DETAILED DESCRIPTION OF THE INVENTION

Figure 1:
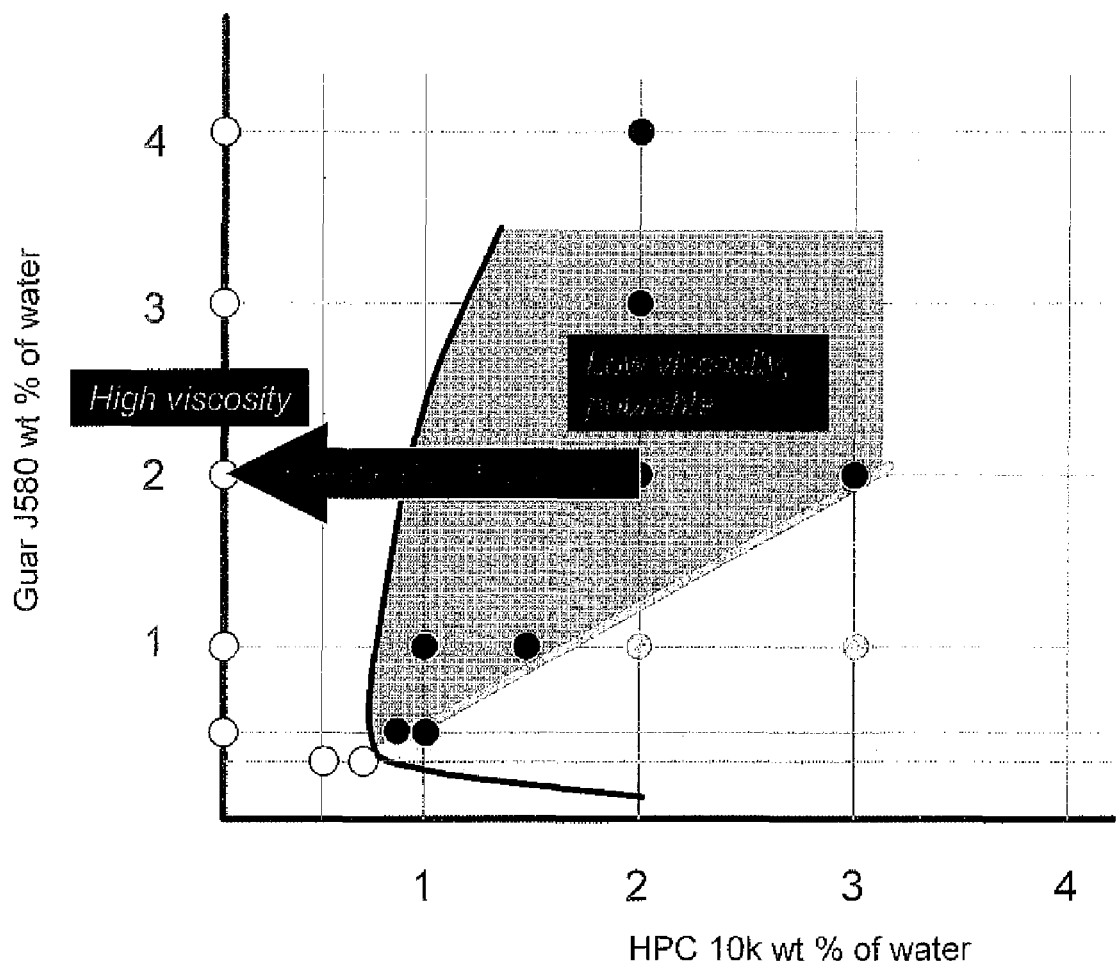
FIG. 1 is a phase diagram for an aqueous solution of guar and hydroxypropylcellulose.

Embodiments of this invention provide a fluid that transports sand or other material at high temperatures encountered downhole but readily drops sand upon cooling off to cooler temperatures encountered in a small settling tank at surface. In so doing, embodiments of the invention provide a composition for a recyclable fluid for wellbore cleanouts and a method of recycling a fluid without the need for periodic chemical additions.

The procedural techniques for pumping fluids down a wellbore to clean out the wellbore or production tubing in a subterranean formation are well known. The person that designs such treatments is the person of ordinary skill to whom this disclosure is directed. That person has available many useful tools to help design and implement the treatments, including computer programs for simulation of treatments.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific numbers, it is to be understood that inventors appreciate and understand that any and all data points within the range are to be considered to have been specified, and that inventors have disclosed and enabled the entire range and all points within the range. All percents, parts and ratios herein are by weight unless specifically noted otherwise.

Two polymers, upon dissolving in a common solvent, may spontaneously separate into two phases that are each enriched in one of the polymers. When two or more different water soluble polymers are dissolved together in an aqueous medium, it is sometimes observed that the system phase separates into distinct regions or phases. The presence of these regions or phases may also be referred to as a "water-in-water emulsion". This separation happens when two polymers at high concentration are each water-soluble but thermodynamically incompatible with each other, such as polyethylene glycol (PEG) and dextran.

The morphology of the de-mixed "emulsion" is related to the relative concentration of the two species. Systems formed with a 50/50 phase volume condition often give rise to bi-continuous phase structures with neither phase being internal or external. Biphasic mixtures formulated away from this bi-continuous condition comprise droplets of one polymer-rich phase dispersed in an external phase enriched with the other polymer. These droplets may be of such a nature that they resemble microspheres or other shapes of consistent composition. The phase behavior and composition of a mixed system depends on the relative polymer concentrations, the interactive associations between the polymer types, and the affinity of each polymer for the common solvent. Temperature, salinity, pH, and the presence of other molecules in solution can all influence the system polymer-polymer and polymer-solvent interactions. Density differences between phases will occasionally give rise to bulk separation if left undisturbed over time.

This phase separation that arises when incompatible polymers are introduced into a system has been studied in other industries. In the food industry, two-phase aqueous fluids are used to create polymer solutions that mimic the properties of fat globules. In the biomedical industry, such systems are exploited as separation media for proteins, enzymes, and other macromolecules that preferentially partition to one polymer phase in the mixture. For example, drug encapsulation and surface modifiers may be selected that comprise water water emulsions because the nontoxic materials are charged and have moderate interfacial tension between two phases. The oilfield service industry may also benefit from biphasic polymer systems for a myriad of applications.

The term water-in-water emulsion as used herein is used to encompass mixtures comprising normally water-soluble polymers in the dispersed phase regardless of whether the dispersed phase is a liquid droplet of low or high viscosity polymer solution, or a paste-like or water wet polymer globule containing solid polymer particles, i.e. the water-in-water emulsion is applicable to both liquid-liquid mixtures and liquid-solid slurries comprising water-soluble polymers. Such two-phase systems are variously referred to in the literature as water-in-water emulsions, biphasic systems, aqueous two phase systems (ATPS), gelling polymer fluid, crosslinked microbeads, aqueous/aqueous emulsion system, aqueous biphasic system, low viscosity polymer fluid, filled system, solvent-in-solvent emulsion, or heterogeneous mixture (with a polymer rich phase and a partitioning agent rich phase). Although they may be referred to as emulsions they do not necessarily contain either oil or surfactant.

Preparing a Composition

The method for combining the components can include the steps of mixing a viscosifying polymer, a partitioning agent, and a first liquid medium to form a heterogeneous mixture comprising a dispersed viscosifying polymer-rich phase and a partitioning agent-rich phase and injecting the well treatment fluid into the well bore. For example, a mixture may use guar gum in solution with hydroxypropyl cellulose (HPC). This water-in-water phase separation between guar and hydroxypropyl cellulose has several applications within the oil field service industry.

Water-in-water emulsions can be formulated to create systems that gel or substantially viscosify by an increase in temperature. As an example, FIG. 1 provides a phase diagram for mixtures of guar gum dissolved with hydroxypropyl cellulose (HPC) in tap water. Compositions to the right of the binodal line in FIG. 1 visibly phase separate over time to become two distinct phases—each rich in one polymer species and lean in the other. Formulations created in the two-phase region of FIG. 1 have appreciably less viscosity than if the same amount of guar had been dissolved in water without the addition of HPC.

In embodiments, the viscosifying polymer can be a thickening polymer effective to increase the viscosity of the well treatment fluid or a friction reducer effective to reduce friction pressure losses when the well treatment fluid is pumped in the well bore at a high flow rate.

In an embodiment, the partitioning agent can comprise a polymer soluble in the liquid media and having a solubility different with respect to the theological polymer. Concentrated solutions of the theological polymer and of the partitioning agent in the first liquid medium are preferably immiscible.

For example, in a lab scale embodiment, dry guar is dissolved and hydrated for 30 minutes in a blender. The guar is introduced in a concentration of 0.2 to 2.0 weight percent. The resulting viscous fluid is agitated continuously, while 1.0 weight percent hydroxypropyl cellulose of 10,000 molecular weight is introduced to the fluid. The two polymers readily phase separate. The guar concentrates into small domains or microspheres within the fluid. The ongoing agitation prevents gravity based settling or agglomeration.

Coiled Tubing Cleanout Fluid

As illustrated by the examples below, a biphasic composition can be used as a thermally reversible fluid capable of acting as a recyclable coiled tubing cleanout fluid. It is notable that this approach allows two distinct advantages. First, because the system depends on the changing phase behavior as a function of temperature, it does not require the addition of chemicals like pH control additives to adjust fluid viscosity. This greatly simplifies the operation since only residence time is required at a relatively warm condition to create a viscous fluid and only residence time is required at a relatively cool condition to substantially lower the fluid viscosity and thereby drop particulates out of suspension. Second, the high level of repeatability in the fluid rheology shown in Examples 1-3 below indicates a stable, repeatable system may be established even with subsequent cycles of the fluid.

Ratio of Components

The ratio of components selected within the fluid may be selected based on a variety of factors. In an embodiment, the mixing step comprises a weight ratio of viscosifying polymer to partitioning agent from 1:4 to 1:5. Another embodiment of the present invention provides the polymer concentrate prepared by a method described above. In an embodiment, the heterogeneous mixture can include from 1 to 4 percent of the viscosifying polymer, by weight of the water in the mixture.

The heterogeneous mixture can comprise from 0.5 to 4 percent by weight theological polymer based on the weight of the liquid media in the heterogeneous mixture. In embodiments, the water-in-water emulsion can comprise from 0.5 to 4 percent of the one or more polymers, by weight of the water in the emulsion.

In an embodiment, the heterogeneous polymer concentrate can have any suitable weight ratio of viscosifying polymer to partitioning agent that provides a heterogeneous mixture, i.e. a binary liquid mixture or a solid-liquid slurry. If the ratio of polymer:partitioning agent is too high, the mixture becomes too thick to pour or pump, or may even form a paste. A polymer:partitioning agent ratio from 1:4 to 5:1 may be suitably employed, or higher or lower ratios may be used where the abovementioned disadvantages are avoided. In one embodiment, the polymer: partitioning agent ratio is from 1:2 to 2.5:1, preferably from 3:5 to 5:3.

Partition Agent

In an embodiment, the present invention uses a partitioning agent that severely limits the solubility of a theological agent, such as a polymer. As a result, the mixture forms a water-in-water emulsion where a concentrated rheological agent is concentrated in the dispersed phase, as a viscous aqueous solution or as water-wet, hydrated, or partially hydrated particles, and the partitioning agent is concentrated in the continuous phase. One exemplary, non-limiting system comprises guar as the viscosifying agent and HPC as the portioning agent.

The selection of the partitioning agent depends on the polymer that is to be concentrated in the heterogeneous mixture, as well as the solvent system, e.g. aqueous, non-aqueous, oil, etc. In one embodiment in general, the partitioning agent is soluble in the solvent medium, but has dissimilar thermodynamic properties such that a solution thereof is immiscible with a solution of the polymer at concentrations above a binodal curve for the system, or such that a solid phase of the polymer will not dissolve in a solution of the partioning agent at the concentration in the system. For example, where the polymer is a high molecular weight hydrophilic polymer, the partitioning agent can be a low molecular weight hydrophobic polymer. For guar and polymers thermodynamically similar to guar, the partitioning agent in an embodiment is a polyoxyalkylene, wherein the oxyalkylene units comprise from one to four carbon atoms, such as, for example a polymer of ethylene glycol, propylene glycol or oxide, or a combination thereof, having a weight average molecular weight from 1,000 to 25,000.

As used herein, "polyoxyalkylene" and refers to homopolymers and copolymers comprising at least one block, segment, branch or region composed of oxyalkylene repeat units, e.g. polyethylene glycol. Polyethylene glycol (PEG) having a molecular weight between 2,000 and 10,000 is widely commercially available. Other embodiments comprise methoxy-PEG (mPEG); poloxamers available as PEG-polypropylene oxide (PPO) triblock copolymers under the trade designation PLURONICS™; alkylated and hydroxyalkylated PEG available under the trade designation BRIJ™, e.g. BRIJ 38™; and the like.

Other examples of partitioning agents can include polyvinyl pyrrolidone, vinyl pyrrolidine-vinyl acetate copolymers, and hydroxyalkylated or carboxyalkylated cellulose, especially low molecular weight hydroxyalkylated cellulose such as hydroxypropyl cellulose having a molecular weight of about 10,000.

Another embodiment of partitioning agents comprises the class of water soluble chemicals known as non-ionic surfactants. These surfactants comprise hydrophilic and hydrophobic groups, that is, they are amphiphilic, but are electrophilically neutral, i.e. uncharged. Nonionic surfactants can be selected from the group consisting of alkyl polyethylene oxides (such as BRIJ™ surfactants, for example), polyethylene oxide-polypropylene oxide copolymers (such as poloxamers or poloxamines, for example), alkyl-, hydroxyalkyl- and alkoxyalkyl polyglucosides (such as octyl or decyl glucosides or maltosides), fatty alcohols, fatty acid amides, and the like.

Viscosifying Polymer

Useful gellable polymers include but are not limited to polymers that are either three dimensional or linear, or any combination thereof. Polymers include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as well. Synthetic polymers such as, but not limited to, polyacrylamide, polyvinyl alcohol, polyethylene glycol, polypropylene glycol, and polyacrylate polymers, and the like, as well as copolymers thereof, are also useful. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups.

In some cases, the polymer, or polymers, include a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$/$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8th Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches: mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

In embodiments, the theological polymer can be a polysaccharide; the partitioning agent a polyalkylene oxide. In a particular embodiment, the heterogeneous mixture can comprise polyethylene glycol and one or more of guar, guar derivative, cellulose, cellulose derivative, heteropolysaccharide, heteropolysaccharide derivative, or polyacrylamide in an aqueous medium.

Additional Fluid Components

In an embodiment, the liquid media can be aqueous and the partitioning agent can include nonionic surfactant. Additionally or alternatively, the method can further comprise the step of dispersing a gas phase in the well treatment fluid to form an energized fluid or foam.

The water-in-water emulsion may further include other additives such as dispersing aids, surfactants, pH adjusting compounds, buffers, antioxidants, colorants, biocides, which do not materially change the miscibility or solubility of the heterogeneous phases, or interfere with the desirable characteristics of the well treatment fluid. The polymer concentrate can include any additive that is to be introduced into the well treatment fluid separately, provided that it is essentially inert in the concentrate. In one embodiment, at least one other well treatment fluid additive is present in the polymer concentrate, such as, for example, proppants, fibers, crosslinkers, breakers, breaker aids, friction reducers, surfactants, clay stabilizers, buffers, and the like. The other additive can also be concentrated in the polymer concentrate so that the additive does not need to be added to the well treatment fluid separately, or can be added in a lesser amount. This can be advantageous where the other additive is usually added proportionally with respect to the polymer. Also, the activity of an additive(s) can be delayed, in one embodiment, and the delay can at least in part be facilitated where the additive is preferentially concentrated in the partitioning agent-rich phase or otherwise reactively separated from the polymer.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer, et al.), which is incorporated herein by reference. Preferably, the gas component comprises a gas selected from the group consisting of nitrogen, air, argon, carbon dioxide, and any mixtures thereof. More preferably the gas component comprises nitrogen or carbon dioxide, in any quality readily available. The gas component may assist in a wellbore treatment operation, as well as the well clean-up process.

The fluid in one embodiment may contain from about 10% to about 90% volume gas component based upon total fluid volume percent, preferably from about 20% to about 80% volume gas component based upon total fluid volume percent, and more preferably from about 30% to about 70% volume gas component based upon total fluid volume percent. In one embodiment, the fluid is a high-quality foam comprising 90 volume percent or greater gas phase. In one embodiment, the partitioning agent used in the polymer delivery system can be selected to enhance the characteristics of the energized fluid or foam, such as gas phase stability or viscosity, for example, where the partitioning agent is a surfactant such as a nonionic surfactant, especially the alkoxylated (e.g., ethoxylated) surfactants available under the BRIJ™ designation.

In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. The crosslinker can be delayed, in one embodiment, and the delay can at least in part be facilitated where the crosslinker or activator is concentrated or otherwise reactively separated in the partitioning agent-rich phase.

Apparatus

A means of mixing a two-phase concentrate and selectively crosslinking one phase to make a water water emulsion includes a continuous stirred tank reactor or a batch vessel. A further embodiment of the invention provides a method for supplying a hydrated polymer solution. The method can include the steps of: (a) supplying theological polymer solids, a partitioning agent and a first aqueous stream to a mixing zone to form a water-in-water emulsion stream; (b) optionally mechanically, thermally or mechanically and thermally processing the water-in-water emulsion stream to improve hydratability of the rheological polymer; and (c) supplying the water-in-water emulsion stream with a second aqueous stream to a dilution zone to form a rheologically modified aqueous stream.

The invention also relates to further processing of the emulsion by wet grinding, high shear mixing and/or heating to enhance the hydration rate in the preparation of the well treatment fluid. Alternatively, a fluid may be prepared on the surface and pumped down tubing while the gas component could be pumped down the annular to mix down hole, or vice versa.

Additional Considerations

The fluids of some embodiments of the invention may include an electrolyte which may be an organic acid, organic acid salt, organic salt, or inorganic salt. Mixtures of the above members are specifically contemplated as falling within the scope of the invention. This member will typically be present in a minor amount (e.g. less than about 30% by weight of the liquid phase). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In some embodiments of the invention, the electrolyte is an organic salt such as tetramethyl ammonium chloride, or inorganic salt such as potassium chloride. The electrolyte is preferably used in an amount of from about 0.01 wt % to about 12.0 wt % of the total liquid phase weight, and more preferably from about 0.1 wt % to about 8.0 wt % of the total liquid phase weight.

Fluids used in some embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine, particularly when used with diutan viscosifying agent at temperatures of approximately 300° F.

Breakers may optionally be used in some embodiments of the invention. The purpose of this component is to "break" or diminish the viscosity of the fluid so that this fluid is even more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH can just as easily eliminate the borate/polymer bonds. At pH values at or above 8, the borate ion exists and is available to crosslink and cause gelling. At lower pH, the borate is tied up by hydrogen and is not available for crosslinking, thus gelation caused by borate ion is reversible. Preferred breakers include 0.1 to 20 pounds per thousands gallons of conventional oxidizers such as ammonium persulfates, live or encapsulated, or potassium periodate, calcium peroxide, chlorites, and the like. In oil producing formations the film may be at least partially broken when contacted with formation fluids (oil), which may help destabilize the film. The breaker can be delayed, in one embodiment, and the delay can at least in part be facilitated where the breaker or breaker activator is concentrated or otherwise reactively separated in the partitioning agent-rich phase.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON™ polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

In some embodiments, water-in-water emulsions are used to provide friction reducers, such as acrylamide polymers and copolymers having pendant cationic and/or anionic groups. By using the friction reducer as the rheological polymer in the water-in-water emulsion, the friction reducer can be provided as a stable concentrate that can rapidly flip when diluted with water to allow the polymer to become completely solubilized in an aqueous treatment fluid, especially a SLICKWATER™ fluid where the friction reducer is added on the fly. Also, in many environments, it would be a particular advantage to be able to viscosify produced waters, river waters, and other "difficult waters" that contain high concentrations of salts or boron, and some embodiments of the invention include forming and treating a subterranean formation with a fluid formed of water-in-water emulsions of the invention and such produced waters, river waters, and other difficult waters.

Embodiments may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like. OK, this is to cover other things being added to the fluids.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

Figure 2:
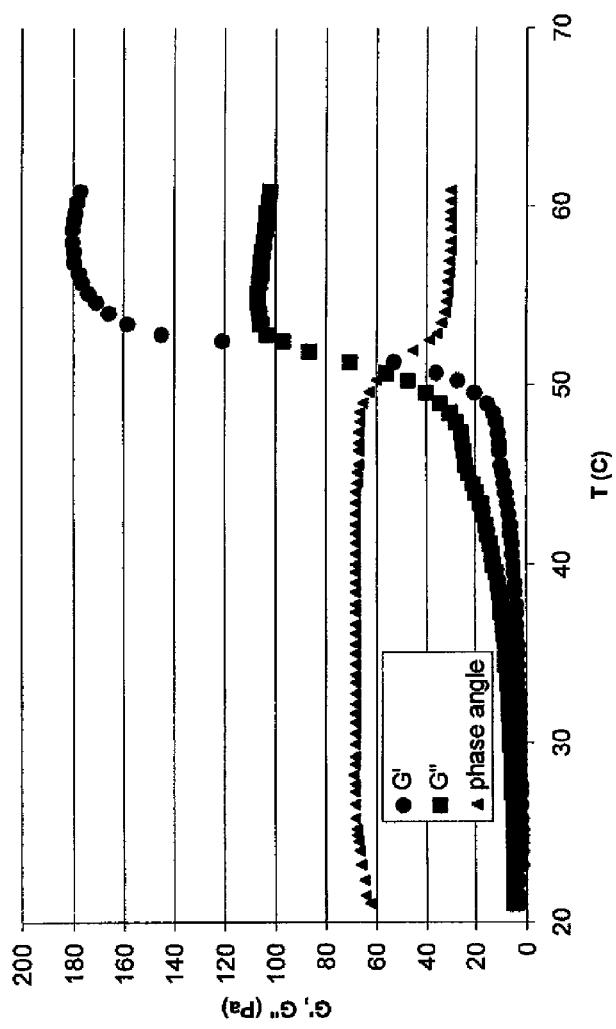
FIG. 2 is a plot of the G' and G" in Pascal as a function of temperature for three solutions.
Figure 3:
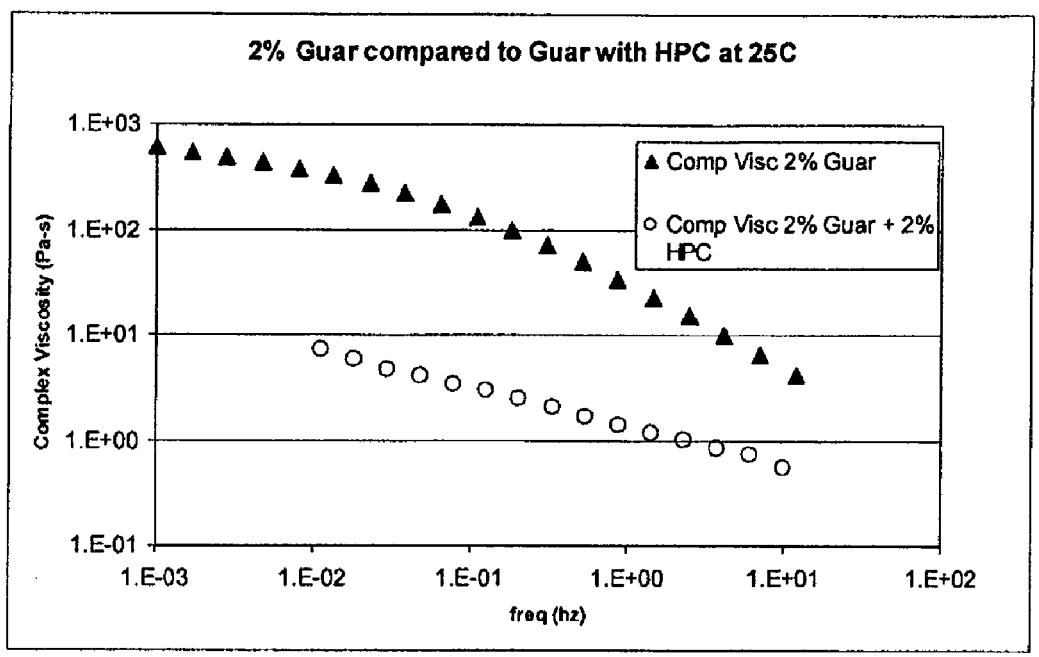
FIG. 3 is a plot of the complex viscosity of two solutions as a function of frequency.

FIG. 2 illustrates that the temperature increase transforms the polymer solution from an easily flowable liquid to a semi-solid gel. For example, for the fluid illustrated by FIG. 2, the LCST is about 51° C. for a 2% guar/2% HPC solution. FIG. 3 illustrates that the rheology of a 2% guar/2% HPC solution at room temperature compared to a 2% guar solution at the same temperature. The addition of the HPC polymer has created a phase-separated solution and reduced the bulk viscosity by approximately one order of magnitude.

As shown in the rheology data and photograph of FIG. 3, heating the two-phase fluid composition above the lower critical solution temperature (LCST) (the temperature above which a particular polymer precipitates out of solution) for one polymer (approximately 57° C. for the HPC in this case) causes the fluid composition to change from being a pourable fluid to being a very viscous gel. The HPC is most likely precipitating and thereby allowing the guar to more effectively viscosify the solution without sharing the solvent with a second polymer phase in solution.

Figure 4:
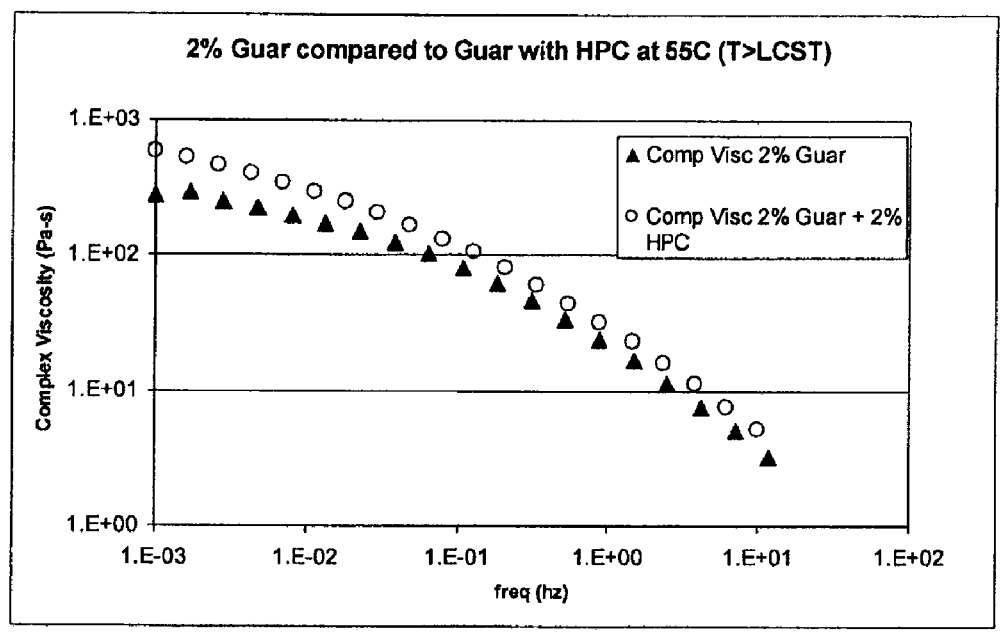
FIG. 4 is a plot of the complex viscosity of two solutions as a function of frequency.

FIG. 4 illustrates the rheology of a 2% guar/2% HPC solution at 55° C. compared to a 2% guar solution at the same temperature. At this temperature, the mixed polymer solution has increased in viscosity to have approximately the same rheological profile as a solution of 2% guar alone.

Figure 5:
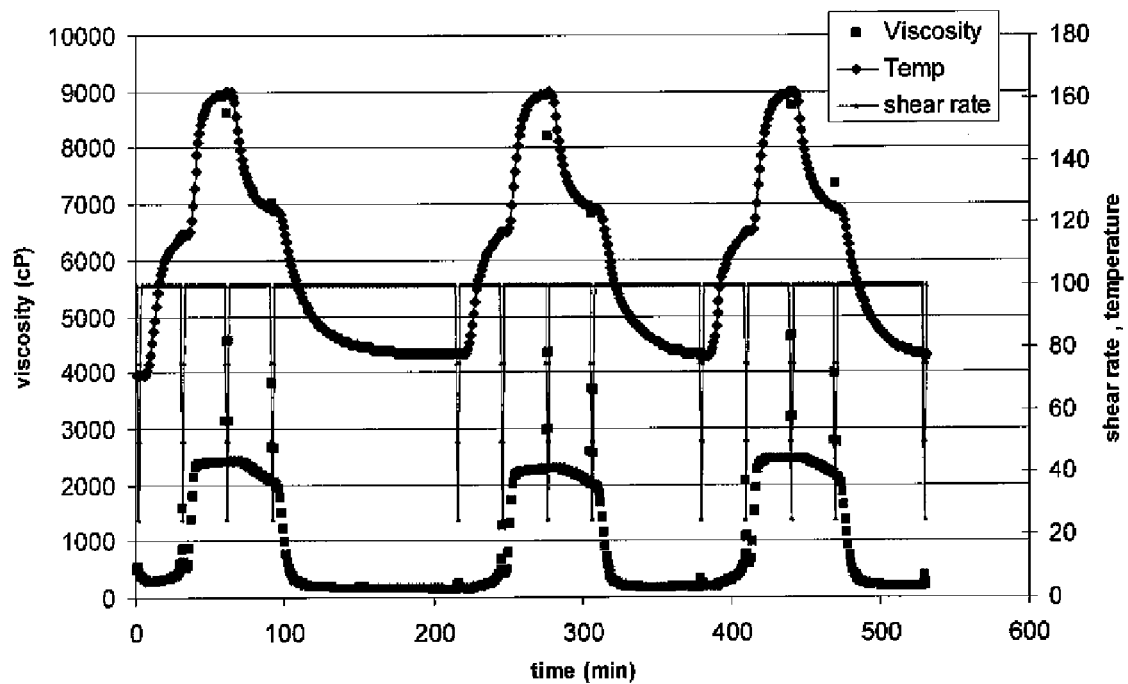
FIG. 5 is a plot of viscosity of and shear rate temperature as a function of time of an embodiment of the invention.

FIGS. 4 and 5 contrast the rheology of the mixed polymer system above and below the critical temperature and compare the mixture rheology to that of the 2 weight percent guar alone at each condition. Along with becoming more viscous the gel also becomes opaque and white—indicative of precipitating HPC. FIG. 5 illustrates Example 1 and that the viscosity of 2% guar and 2% HPC dissolved in water with temperature changing from room temperature to 71° C. and then back to room temperature. As shown in the rheology measurements of FIG. 5, the rheology of the heated solution closely matches that of a 2 weight percent guar solution at the same elevated temperature without any HPC.

Reversibility of Thermal Thickening

Unexpectedly, the "thermal thickening" documented in FIGS. 2, 3, and 4 above is reversible, that is, controllable with changes in temperature. Presumably, this occurs when the HPC polymer returns to solution to re-create the two-phase, low viscosity equilibrium with the guar when the temperature of the mixture is dropped. This is illustrated in the viscosity curves of Examples 1 through 3 when different mixtures of guar and HPC are subjected to temperature increase and decrease over time with continuous measurement of viscosity. In each case the measurements begin at approximately room temperature and track the fluid rheology as the temperature is increased to 71° C. and then back to room temperature. The viscosity of the material was consistently controlled by adjusting the temperature for three cycles. Specifically, the change in viscosity was less than 10 percent over three similar increases in temperature to the LCST, in this instance, the temperature increased from about 25° C. to about 71° C.

Figure 6:
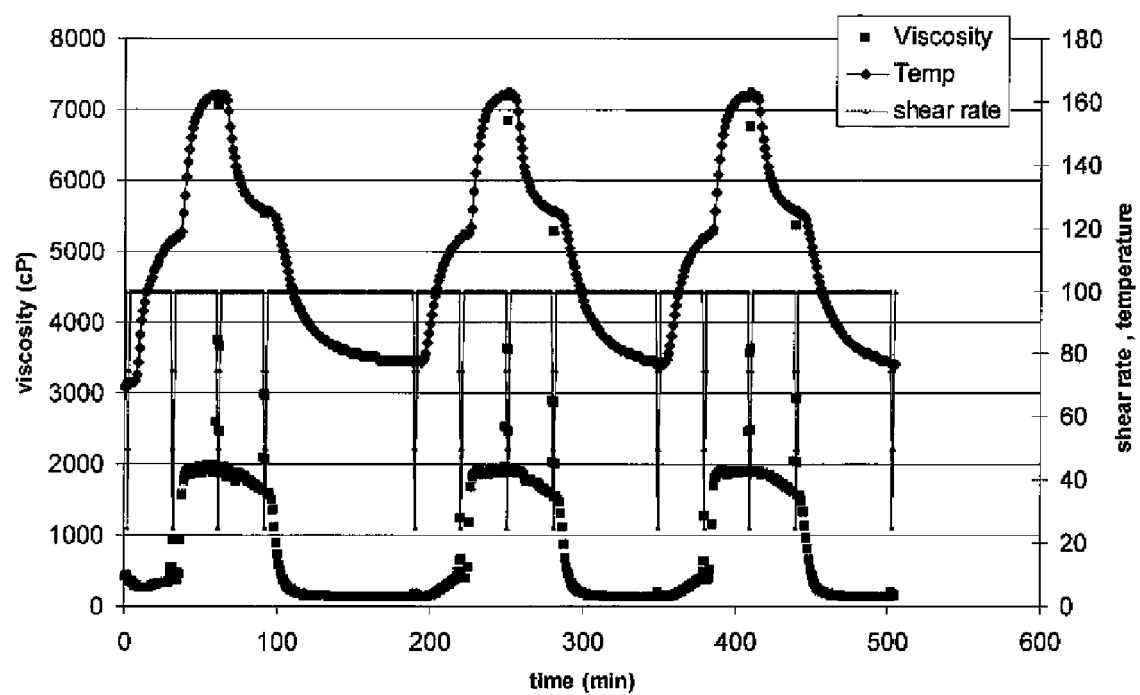
FIG. 6 is a plot of viscosity of and shear rate temperature as a function of time of an embodiment of the invention.

FIG. 6 illustrates Example 2. FIG. 6 shows the viscosity of 2% guar and 3% HPC dissolved in water with temperature changing from room temperature to 71° C. and then back to room temperature. The increase in viscosity is about Specifically, the change in viscosity was less than 10 percent over three similar increases in temperature to the LCST, in this instance, the temperature increased from about 25° C. to about 71° C.

Figure 7:
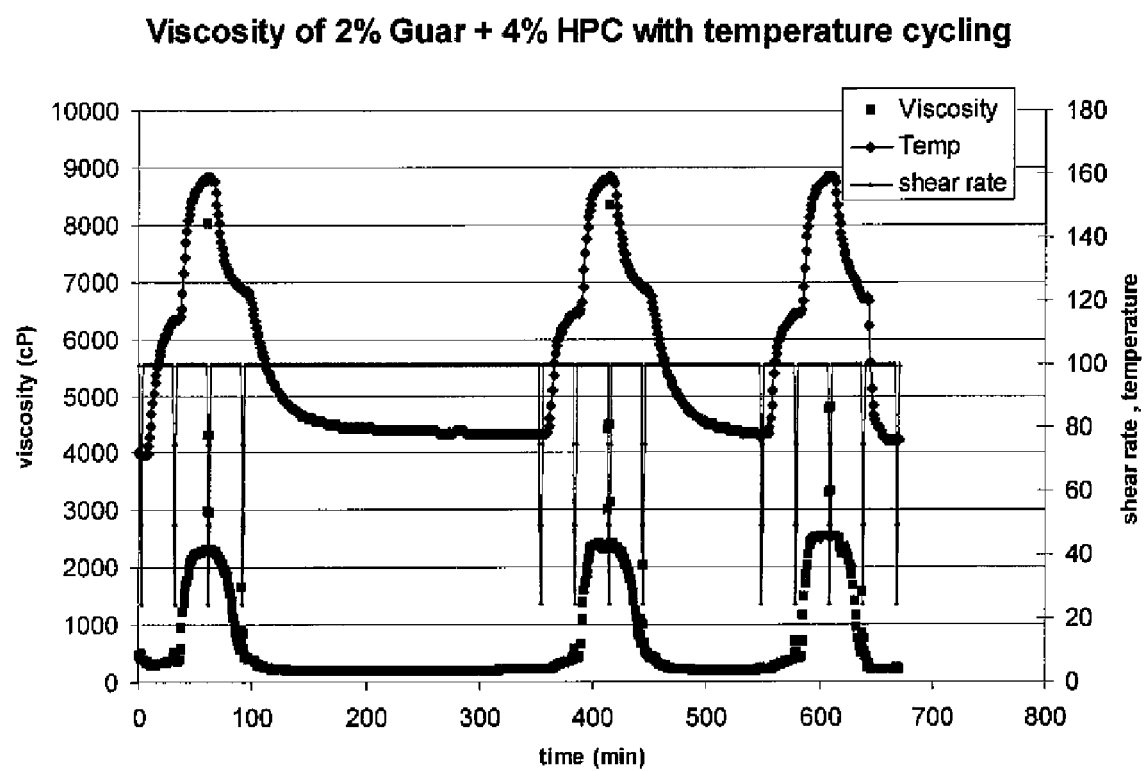
FIG. 7 is a plot of viscosity of and shear rate temperature as a function of time of an embodiment of the invention.

FIG. 7 illustrates Example 3. FIG. 7 shows the viscosity of 2% guar and 4% HPC dissolved in water with temperature changing from room temperature to 71° C. and then back to room temperature. Specifically, the change in viscosity was less than 10 percent over three similar increases in temperature to the LCST, in this instance, the temperature increased from about 25° C. to about 71° C.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of forming a fluid for use within in a subterranean formation, comprising:
   combining a partitioning agent and viscosifying polymer into a fluid;
   introducing the fluid into the subterranean formation; and
   recovering at least a portion of the fluid at a surface of the subterranean formation
   wherein a change in viscosity of at least a portion of the fluid is less than 10 percent over an increase in temperature to a least about a lower critical solution temperature for at least a portion of the fluid.

2. The method of claim 1, further comprising cooling the fluid while recovering the fluid.

3. The method of claim 1, further comprising introducing into the subterranean formation at least a portion of the fluid that undergoes recovering.

4. The method of claim 1, wherein the viscosifying polymer is guar.

5. The method of claim 1, wherein the partitioning agent is polyethylene glycol.

6. The method of claim 1, wherein a temperature of the subterranean formation is about 45° C. or above.

7. The method of claim 1, wherein a temperature of the uppermost surface of the subterranean formation is about 45° C. or below.

8. The method of claim 1, wherein the difference between the temperature of the uppermost surface and the subterranean formation is at least about 10° C.

9. The method of claim 1, wherein the viscosity of the fluid in the subterranean formation is higher than the viscosity of the fluid at the surface of the subterranean formation.

10. The method of claim 1, further comprising cooling to at least the temperature of the surface of the subterranean formation.

11. The method of claim 10, wherein the change in viscosity is less than 10 percent over at least three increases in temperature to at least about the lower critical solution temperature and at least two decreases in temperature to at least the temperature of the surface of the subterranean formation.

12. The method of claim 1, wherein the partitioning agent in the fluid is at a concentration of about 1 to 4 weight percent.

13. The method of claim 1, wherein the viscosifying polymer in the fluid is at a concentration of less than 4 weight percent.

14. A method of forming a fluid for use within in a subterranean formation, comprising:
   combining a partitioning agent and viscosifying polymer into a fluid;
   introducing the fluid into the subterranean formation at a temperature of about 45° C. or higher; and
   recovering at least a portion of the fluid at a surface of the subterranean formation at a temperature of about 45° C. or lower
   wherein a change in viscosity of at least a portion of the fluid is less than 10 percent over an increase in temperature to a least about a lower critical solution temperature for at least a portion of the fluid.

15. The method of claim 14, wherein the viscosity of the fluid in the subterranean formation is higher than the viscosity of the fluid at the surface of the subterranean formation.

16. The method of claim 15, wherein the partitioning agent in the fluid is at a concentration of about 1 to 4 weight percent.

17. The method of claim 14, wherein the viscosifying polymer in the fluid is at a concentration of less than 4 weight percent.

* * * * *